United States Patent [19]
Gaertner et al.

[11] Patent Number: 5,996,063
[45] Date of Patent: Nov. 30, 1999

[54] MANAGEMENT OF BOTH RENAMED AND ARCHITECTED REGISTERS IN A SUPERSCALAR COMPUTER SYSTEM

[75] Inventors: Ute Gaertner; Klaus Jörg Getzlaff, both of Schönaich; Thomas Koehler; Erwin Pfeffer, both of Holzgerlingen, all of Germany

[73] Assignee: International Business Machines Corporation, Armonk, N.Y.

[21] Appl. No.: 08/815,351

[22] Filed: Mar. 11, 1997

[30] Foreign Application Priority Data

Mar. 3, 1997 [EP] European Pat. Off. .............. 97103419

[51] Int. Cl.$^6$ ........................................................ G06F 9/38
[52] U.S. Cl. ........................... 712/215; 712/216; 712/200
[58] Field of Search ..................... 395/391, 392, 395/376; 712/215, 216, 200

[56] References Cited

U.S. PATENT DOCUMENTS

| | | | |
|---|---|---|---|
| 5,367,650 | 11/1994 | Sharangpani et al. | 395/376 |
| 5,371,684 | 12/1994 | Iadonato et al. | 364/491 |
| 5,560,032 | 9/1996 | Nguyen et al. | 395/800 |
| 5,694,564 | 12/1997 | Alsup et al. | 395/376 |
| 5,721,855 | 2/1998 | Hinton et al. | 395/394 |
| 5,737,624 | 4/1998 | Garg et al. | 395/800.23 |
| 5,765,215 | 6/1998 | Afsar et al. | 711/214 |

*Primary Examiner*—Zarni Maung
*Assistant Examiner*—Saleh Najjar
*Attorney, Agent, or Firm*—Marc A. Ehrlich

[57] ABSTRACT

The invention relates to the area of register renaming and allocation in superscalar computer systems. When a multitude of instructions in the instruction stream reads from or writes to a certain logical register, said logical register will have to be represented by a multitude of physical registers.

Therefore, there have to exist several physical rename registers per logical register. The oldest one of said rename registers defines the architected state of the computer system, the in-order state.

The invention provides a method for administration of the various register instances. Both the registers representing the in-order state and the various rename instances are kept in one common circular buffer. There exist two pointers per logical register: The first one, the in-order pointer, points to the register that represents the in-order state, the second one, the rename pointer, points to the most recent rename instance.

13 Claims, 9 Drawing Sheets

FIG. 1

| | | | instances of R3 | |
|---|---|---|---|---|
| 200 | OR | R2, R3 | R3.1 as source | (208) |
| 201 | BC | M1, (R1, R2, displ.) | | |
| 202 | L | R3, (R4, R3, displ.) | R3.1 as source<br>R3.2 as target | |
| 203 | A | R3, (R1, R2, displ.) | R3.2 as source<br>R3.3 as target | (209) |
| 204 | ST | R1, (R4, R3, displ.) | R3.3 as source | (210) |
| 205 | OR | R3, (R1, R2, displ.) | R3.3 as source<br>R3.0 as target | |
| 206 | ST | R3, (R3, R3, displ.) | R3.0 as source | (211) |
| 207 | L | R3, (R4, R3, displ.) | R3.0 as source<br>R3.1 as target | |
| | | | | (212) |

|  | 500 | 501 | 502 | 503 | 510 |
|---|---|---|---|---|---|
|  | Col0 | Col1 | Col2 | Col3 | I0 I1 |
|  | | | 16 x 4 x 36 | | 16 x 2 |
|  | 508 | 509 | 506 | 507 | 511 |
| R7: (504) | rname | () | inord | rname | 10 |
|  | ⋮ | ⋮ | ⋮ | ⋮ | ⋮ |
| R10: (505) | () | inord | rname | () | 01 |
|  | 516 | 513 | 514 | 515 | 512 |

FIG. 7 format of a reservation station entry

FIG. 8A format of source data fields S0, S1, A0, A1:

FIG. 8B format of source data fields T0, T1:

MANAGEMENT OF BOTH RENAMED AND ARCHITECTED REGISTERS IN A SUPERSCALAR COMPUTER SYSTEM

FIELD OF THE INVENTION

The invention is related to allocating and renaming registers in a computing system which processes instructions out-of-order, and in particular to keeping track of an architected machine state comprising architected register values.

BACKGROUND OF THE INVENTION

For a long time, processors have executed instructions in their sequential order. This implies that instructions are forwarded to the processor's execution units in the same order as they appear in the program sequence, one after the other.

In such a system, read- and write-operations to any of the processor's registers occur in exactly the same sequence as indicated by the program. Therefore, there exists a one-to-one correspondence between the registers and their values. At any given point in execution, a register identifier precisely identifies the value contained in the corresponding register. This value of a register also represents the actual machine state and can be referred to as the architected register value.

In order to achieve higher instruction throughput, and thus a higher performance, processors that issue, or initiate execution of, multiple independent instructions per clock cycle were introduced. Such processors are known as superscalar processors. Multiple instructions can be executed in a single cycle, as long as there are no data dependencies, procedural dependencies, or resource conflicts. When such dependencies or conflicts exist, only the first instruction in a sequence can be executed. As a result, a plurality of functional units in a superscalar architecture can not be fully utilized.

The next step in the development of high performance processors is to be seen in the introduction of out-of-order processing. Out-of-order processors disobey the instruction sequence when executing a program, and process instructions in a different order than the sequential order.

But if an instruction A produces target data, and said target data is needed by an instruction B as source data, this data dependency has to be taken care of. When instructions are issued out-of-order, correspondence between registers and values breaks down. Several register values corresponding to one logical register may exist in parallel, because each write access to a certain logical register creates a new instance of said register.

The values of different register instances must not be confused. Therefore, register arrays have to be provided that can hold and identify a multitude of values per logical register. Before instructions can be dispatched to any of the execution units, it has to be indicated which instances of the addressed logical registers are to be used. The task of identifying the actual storage cell representing a logical register at a given moment is usually referred to as "register renaming".

A new instance of a certain logical register is created each time a write access to said logical register occurs. Thus, each instruction that modifies any register produces a new physical instance of said register, and for each new instance, a physical register in the register array has to be allocated.

When allocating a new physical register each time a logical register is modified, there also has to exist a mechanism for getting rid of old register instances. Otherwise, the system would accumulate an indefinite amount of register instances. An instance can be destroyed when its value is superseded and there are no outstanding references to said value.

When processing instructions in their sequential order, there always exists a defined "state" of the processor. This defined state must be saved for a program that is suspended, in order to provide for the possibility of "precise interrupts". In case an exception occurs, the processor has to be able to return to said defined state. Also in case a branch has been mispredicted, and several instructions following said branch have speculatively been executed, the processor has to be able to return to a well-defined, non-speculative machine state.

The question arises how said state, and the corresponding architected register values, can be defined in an out-of-order processing system. Even though instructions are processed out-of-order, it is desirable to advance said architected state in order.

One approach for defining an architected in-order state is the following: If an instruction is completed and all previous instructions have also been completed, the instruction's results can be stored as the corresponding register's in-order state, and the instruction can be considered "retired". Thus, the architected state of an out-of-order processing system can be defined by the most recently completed instruction of the continuous string of completed instructions. The corresponding architected register values are the values at the moment said instruction was completed. In case of exceptions, and in case of mispredicted branches, the machine resumes instruction execution at said architected state.

One concept for both being able to handle different register instances, and for continuously advancing said architected in-order state, is the use of a reorder buffer in combination with a register file. When an instruction is decoded, it is assigned an entry at the top of the reorder buffer. Said reorder buffer is implemented as a first-in first-out (FIFO) buffer. When the instruction completes, its result value is written back to the allocated entry. When the value reaches the bottom of the buffer, and if no exception has occurred, it is written to the register file. If the instruction is not complete when it reaches the bottom, the reorder buffer does not advance until the instruction completes. While the speculative values of various register instances are contained in the reorder buffer, the register file holds the architected register values and thus defines the in-order state. In case an exception or a misprediction of a branch occurs, the reorder buffer is discarded and the in-order state is accessed.

One disadvantage of this solution is that register values have to be transferred from said reorder buffer entries to the register file. In case a precise interrupt occurs, the values of said register file are accessed.

There exist a variety of different solutions that use a separate register file for holding the architected register values. The temporary values of the different register instances may either be contained, as described, in the reorder buffer, or in the instruction window itself, or in a separate temporary register array. All these solutions have one disadvantage in common: Register values have to be transferred from a temporary register storage—no matter how said storage is implemented—to a register array or a register file holding the architected in-order register values.

In the international application PCT/JP93/00553, "A system and method for retiring instructions in a superscalar microprocessor" to J. Wang, S. Garg, and T. Deosaran, a system and method for keeping track both of architected state and rename instances of an out-of-order processing system's logical registers is provided. According to the technique disclosed, results of instructions executed out-of-order are first stored in a temporary buffer, until all previous instructions have been executed.

As soon as all previous instructions have been executed, and their results have been stored in order in a register array, the results of the instruction in question can be written to said register array, and the instruction is considered retired. To maintain the integrity of register array data, results of instructions are not written to the register array until the results of all previous instructions have been written. In this manner, the machine state is updated in sequential order. The solution described comprises means for assigning and writing instruction results to a temporary storage location, for transferring results from temporary storage to the register array, so that the register array is updated in-order, and for accessing both the temporary storage and the register array for subsequent operations.

Again, retiring register values is done by transferring them to a register array which holds the "final register values". A constant data traffic between said temporary register array and said final register array is necessary.

In case the actual value of a certain logical register is to be determined, it first has to be checked whether there exist an instance in said temporary register file. In case there is no temporary instance, said final register array has to be accessed. This data access in two steps requires both time and additional logic.

OBJECT OF THE INVENTION

It is an object of the invention to provide a system and method for managing both the architected values and the provisional rename instances of logical registers in an out-of-order processing system, which allows for a quick recovery to the processing system's architected state, and which avoids the drawbacks of prior art solutions.

In particular, it is an object of the invention to avoid superfluous data transfer between registers representing the in-order state and registers representing rename instances.

SUMMARY OF THE INVENTION

The object of the invention is solved by a computer system according to claim 1, and by a method according to claim 10.

Said computer system is characterized by array means which contain both said physical registers representing the architected states of said logical registers, and said physical registers representing rename instances of said logical registers, and by first indication means determining which of the physical registers of each set of physical registers actually represents said architected state of said logical register.

By keeping both the physical register representing the architected states and the physical registers representing the rename instances in one array, the amount of storage required is decreased. This saves variable chip real estate.

The physical register representing the actual architected state is determined by said first indication means. The physical registers are not changed at all, instead, said first indication means are changed. Therefore, it is not necessary any more to transfer register values from a temporary array to a register file. Superfluous data transfers are avoided.

In case a physical register representing the architected state is retired, another physical register has to represent the architected state. This is achieved by updating said first indication means accordingly.

In a further embodiment of the invention, second indication means indicating which of the physical registers of each of said sets of physical registers actually represents the sequentially most recent one of said rename instances.

By introducing said second indication means, it is possible to do the renaming of logical registers to physical registers in a much simpler way. In order to determine the correct physical register representing the actual instance, it is only necessary to read out said second indication means.

In case a new physical register is to be allocated, said second indication means have to be updated, in order to indicate said physical register as the sequentially most recent physical register.

In a further embodiment of the invention, said first indication means and/or said second indication means are realized as pointers, indicating which of the physical registers of each set of physical registers actually represents said architected state of said logical register.

Implementing said indication means as pointers only requires several bits per logical register. Therefore, this is the cheapest and easiest way of implementing said indication means. An update of said pointers can simply be performed by incrementing said pointers.

In a further embodiment of the invention, said array means are implemented as circular array means, wherein physical registers which have represented the architected state of one of said logical registers, and which do not represent the architected state of said logical register any more, are reusable for representing new rename instances.

Whenever a physical register representing the architected state is committed, said physical register can be reassigned. Thus, it is possible to get along with a lower amount of physical registers. The amount of storage required is lowered, and less chip real estate is required. This is especially important as the register file exists several times, once per functional unit.

In a further embodiment of the invention, said computer system further comprises retiring means for setting free the physical register representing said architected state of one of the logical registers, determining the sequentially oldest one of said set of physical registers representing rename instances of said logical register, which is to furtheron represent said architected state of said logical register, and updating said first indication means, with said first indication means determining which of the physical registers of each set of physical registers actually represents said architected state of said logical register.

This corresponds to the method of administrating a set of at least one physical register representing a logical register in a computer system, given in claim 10. Said method comprises the steps of setting free said physical register representing said architected state of said logical register, and determining the sequentially oldest one of said set of physical registers representing rename instances of said logical register which is to furtheron represent said architected state of said logical register.

When advancing the architected state of the computer system in order, it is necessary to retire the actual in-order register, and to determine the sequentially following physical register as representing the new architected state. The advantage of the invention is that no data movements are necessary in order to continuously advance said architected state. Instead, said first indication means are changed accordingly. This can easily be done by incrementing pointers, which allows for a fast and simple update. Register that are that set free can immediately be reused to represent new rename instances.

DETAILED DESCRIPTION OF THE INVENTION

Figure 1:
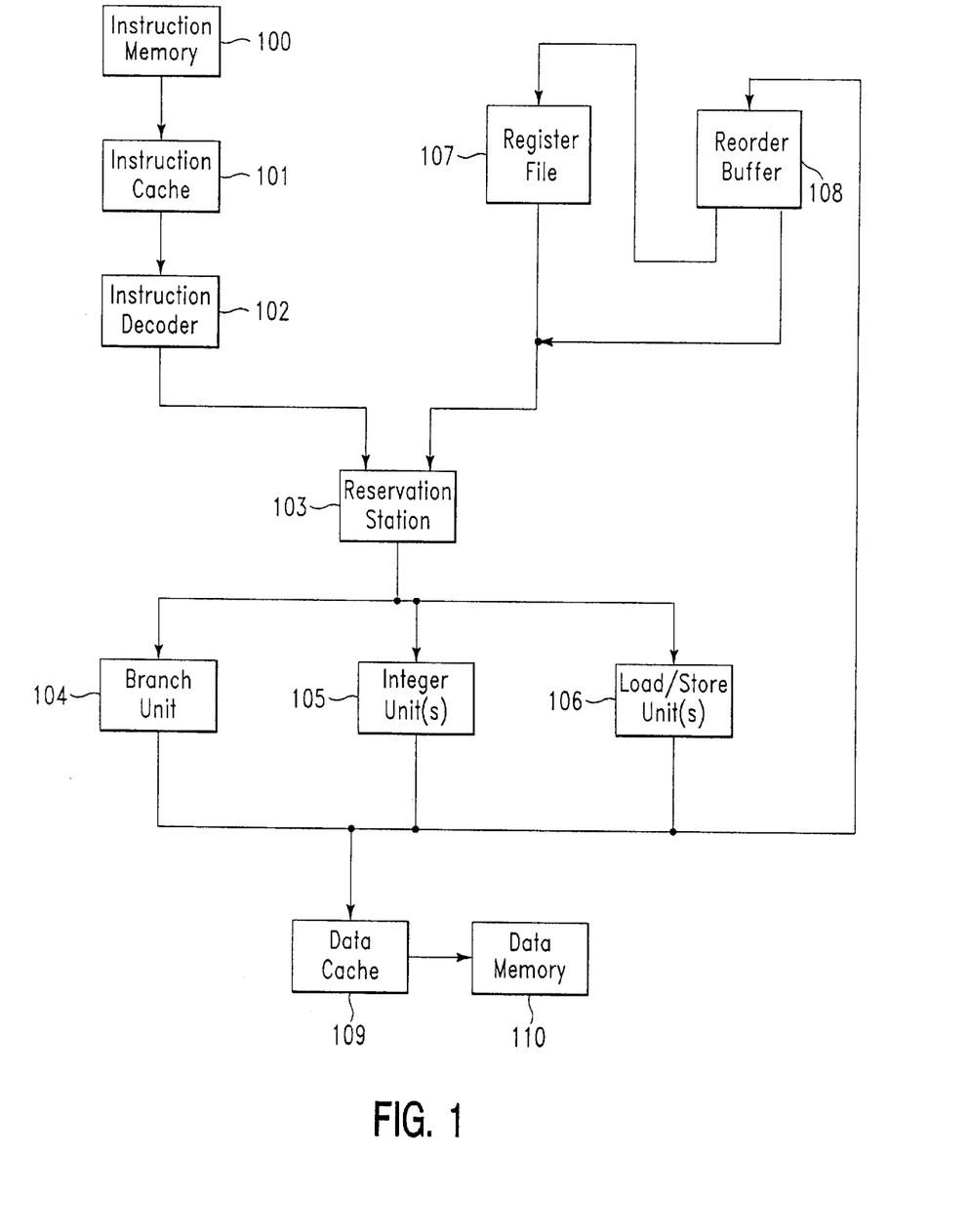
FIG. 1 shows the general structure of an out-of-order processing system.

In FIG. 1, the typical setup of an out-of-order processing system is shown. Instructions are fetched from the instruction memory (100) and buffered in-sequence in the instruction cache (101). Next, the instructions are decoded (102) to a common internal instruction format. There also exist solutions where one external instruction is broken up into a number of small, internal instructions, which can then be processed out-of-order. The instruction decode unit (102) is also responsible for dependency resolution, which means that actual physical storage cells have to be assigned to the logical registers which are used as sources and targets of the respective instructions. At this stage, it is indispensable to keep track of the different instances of each logical register that arise in the course of program execution.

Branch prediction is also performed at the instruction decoding stage.

The instructions are then forwarded to the reservation station (103). For each target register instance of an instruction, an entry is made in the reorder buffer (108). Therefore, the reorder buffer identifies, in the order of occurrence, which is the sequential order, all the physical registers that represent instances of logical registers. In the reservation station, the instructions wait until all the source data they need has been calculated. In case the source data needed by a certain instruction has already been calculated as target data of an earlier instruction, this target data is contained in the register file (107), and can be obtained from there. In case the source data needed by a certain instruction has not been evaluated yet, the instruction has to monitor the results emerging from the different execution units.

In case all the source data of a certain instruction have arrived, the instruction itself can be dispatched to one of the execution units, dependent on its type, and dependant on the availability of execution units. In case of a branch, the instruction has to be dispatched to the branch unit (104), integer arithmetics have to be forwarded to one of the integer units (105), and instructions that access memory have to be dispatched to one of the load/store units (106). Thus, each instruction is processed by the corresponding functional unit, and the instruction's target data can be calculated. In case of a memory access, the load/store unit (106) either writes data to or receives data from a data memory (110) via a data cache (109).

The so-called "commit process" is responsible for retiring instructions, which means that the target register values of said instructions become architected register values. Instruction are always committed in-order. Therefore, the retire pointer, together with the architected register values, defines a precise state of the machine. This machine state is not subject to any changes any more. It advances in sequential order. Therefore, precise interrupts become possible.

When instructions that read from or write to one and the same register are executed, their sequential order has to be maintained. If one does not intend to obey to the requirement of sequential execution, data dependencies between different instructions accessing the same resource have to be resolved first. This is done by assigning different physical registers to the different instances of a resource, such as a logical register. This is called "register renaming" and is one of the essential features of every out-of-order-processing system.

Figure 2:
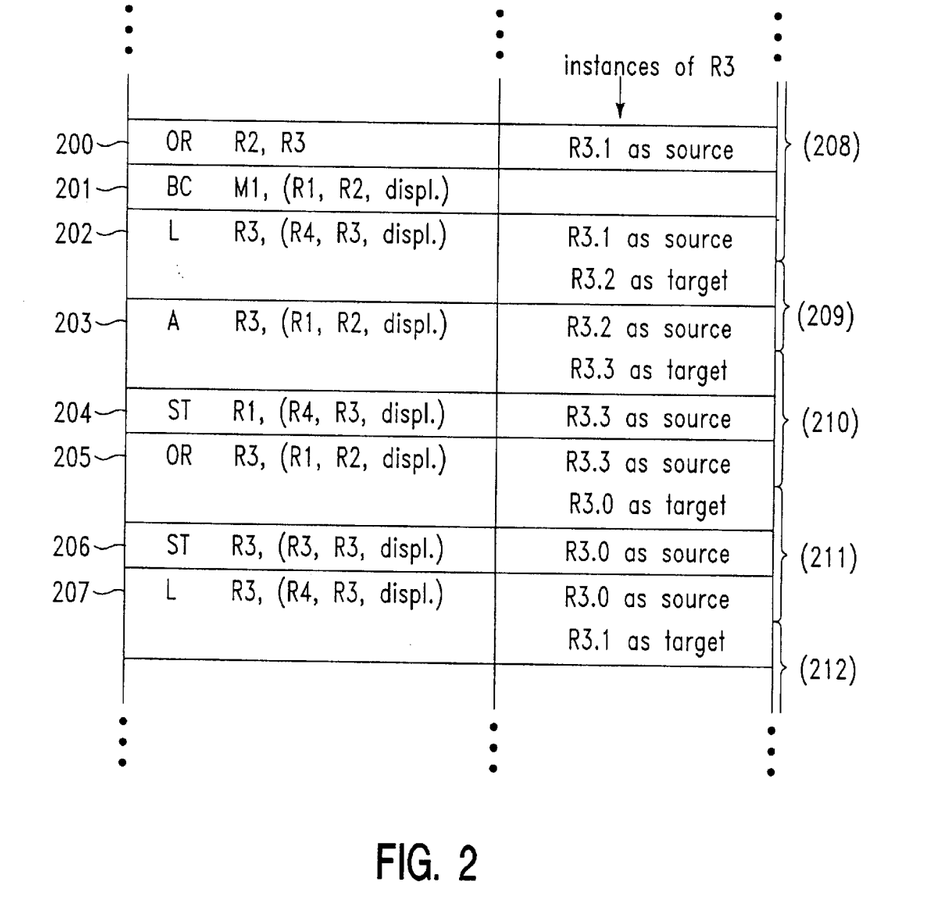
FIG. 2 gives a program example, which is to be executed out-of-order. In order to do this, the addressed logical registers have to be renamed to physical registers.

FIG. 2 illustrates this by means of a program example. The occurrence of different instances of register R3 is indicated in the right-hand column of FIG. 2.

In instruction 200 the contents of register R2 and R3 are ORed; the result is written back to register R2. Here, the register R3 (the only one we'll look at) is only used as a source register.

Let us therefore call this instance of R3 R3.1, as indicated in the right-hand column.

Next, a "branch on condition" (201) is performed. The condition which determines whether the branch is to be taken or not is contained in register M1. Registers R1 and R2 contain the index and base values, which are used, together with the displacement, to calculate the jump-address. In case the branch is to be taken, program execution continues at the address indicated by R1, R2 and the displacement.

The next instruction (202) is a load operation, which fetches data from memory. R4, R3 and the displacement are used for calculating the respective memory address. The memory content fetched is to be stored to register R3. Thus, R3 is first used as a source operand (for address arithmetic), and then as a target. The register instance used as a source is the same as that used in instruction 200, the instance R3.1. A different instance of R3 has to be assigned to the target of instruction 202, because the load-operation will modify the content of R3. In case the instructions following instruction 202 use R3 as a source, they therefore must not obtain the value of instance R3.1 any longer, because of said modification. For this reason, a new physical instance of register R3, R3.2, has to be allocated for the target of the load operation 202.

In 203, an add operation is performed. Address arithmetic using R1, R2 and a displacement determines an address, and the content of said address is added to the content of R3. The result is stored to R3. Thus, again R3 is first used as a source, and then as a target. As R3 most recently has been modified in instruction 202, the source register value used in instruction 203 has to equal the target register value of instruction 202; it is R2.2. For the target of instruction 203, a new physical register has to be allocated, and a new register instance, R3.3, is assigned to the target of instruction 203.

The store operation 204 stores the content of R1 to an address determined by R4, R3 and a displacement. R3 is used as a source operand in address arithmetic, the instance is R3.3.

Next, in 205, the address determined by R1, R2, and a displacement is accessed, and its content is ORed with the content of register R3. The result of said OR-operation is stored back to R3. The OR-operation's source register instance is R3.3, and R3.0 is assigned to the target. The wrap-around from 3 to 0 occurs because in the solution that will be described in the following, only four different register instances of each register can be handled in the register file at a given time. Of course, one could also allow for a larger number of rename instances.

Instruction 206 stores the content of R3 to a memory address determined by R3 (which is used both as an index and a base) and a displacement. The source register instance used here is R3.0.

In 207, a load access to the address (R4, R3, displacement) occurs, with the result of said load operation being stored to R3. R3 is uses both as a source (for address arithmetic), and as a target. While R3.0 is the instruction's source register instance, R3.1 is allocated as the new target register instance.

When looking at this program sequence, it becomes obvious that in the different segments 208–212 of the instruction stream, different instances of R3 are used. The instructions using R3.0 as a source (206, 207) can only be executed after instance R3.0 has been calculated. This means that instruction 205 has to be executed before either instruction 206 or 207 can be dispatched, but it is of no importance whether instruction 206 or instruction 207 is dispatched first.

The restrictions posed on executing instructions out of their sequential order can be summarized as follows: Whenever a new register instance emerges as the target of an instruction, dispatching instructions which use said register instance as a source register has to be postponed until said register instance has been calculated.

Figure 3:
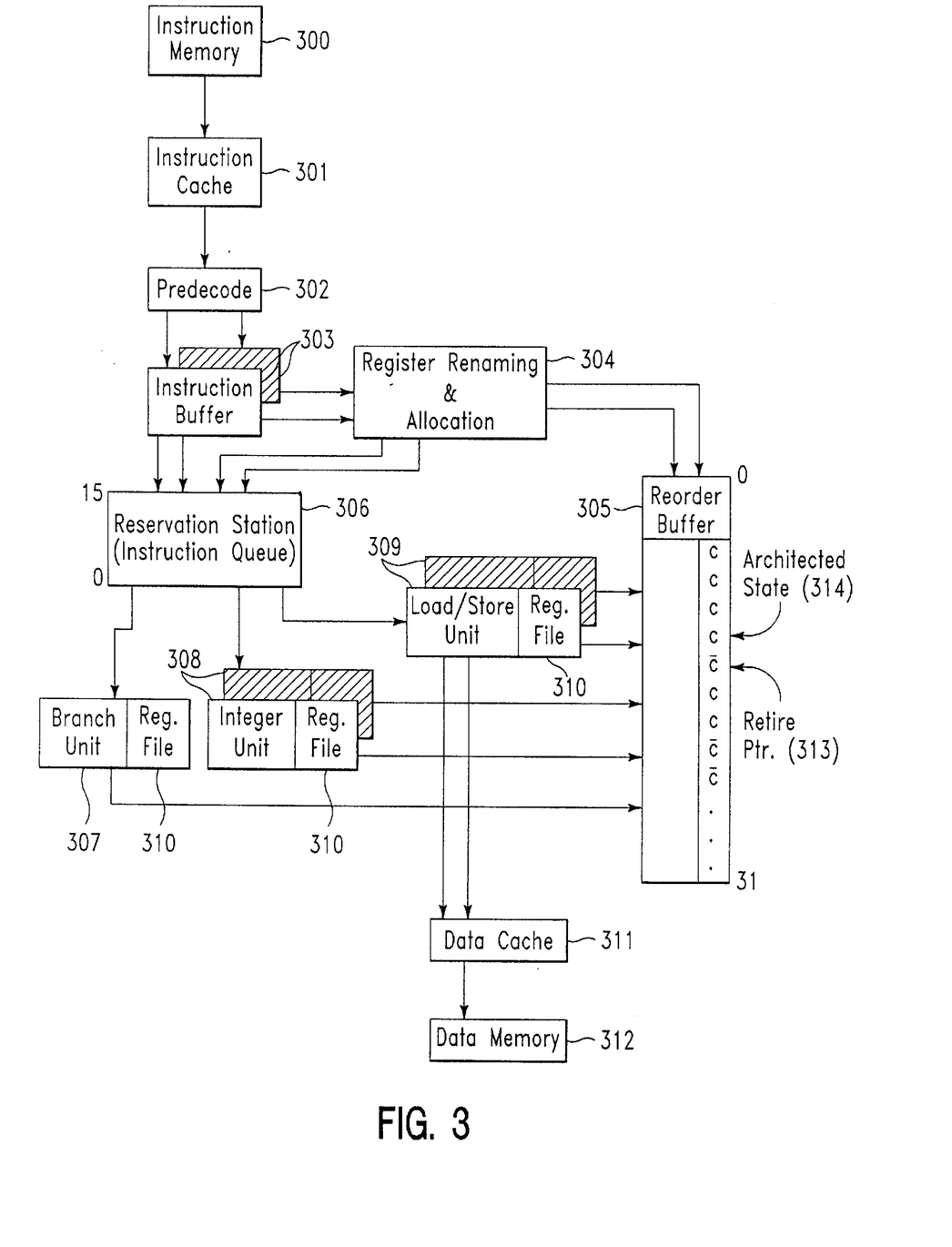
FIG. 3 gives a more detailed view of an out-of-order processing system, comprising a register renaming and allocation unit.

In FIG. 3, a more detailed block diagram of a superscalar computersystem is given. Emphasis is put on the handling of the different register instances. As in FIG. 1, instructions that are contained in instruction memory (300) are first transferred to an instruction cache (301). Next, the instructions are forwarded in order to a predecode unit (302), which transforms the instructions of the external instruction stream to a common instruction format suitable for out-of-order processing. In this instruction format, there exist data fields for the OP-code, for at most two source registers, for two registers used for address arithmetic in case the instruction has to access memory, and for at most two target registers.

When looking at the left-hand column of FIG. 2, where an instruction sequence which could be part of an external instruction stream is shown, it becomes obvious that in the external instruction stream, an instruction only references the logical registers that are to be read or modified. The whole problem of different physical instances one logical register can have in the course of instruction execution is not solved at this stage yet. As long as the instructions of the external instruction stream are processed in order it is not even necessary to bother about this problem. But as soon as instructions are executed out of their regular order, it is necessary to carefully keep track of the different physical instances of one and the same logical register. This is shown for the logical register R3 in the right-hand column of FIG. 2. The problem is solved by assigning one physical register to each instance of a logical register. This means that whenever an instruction modifies a certain logical target register, and thus creates a new instance of said logical register, a new physical register has to be allocated. Whenever this instance of said logical register is used as a source by any other instruction, the same physical register has to be used. As there may exist a multitude of instances of one logical register, there may also exist a multitude of physical registers corresponding to said logical register.

The task of analyzing which physical register corresponds to a logical register used by a certain instruction, replacing said logical register by the appropriate physical register (register renaming), and allocating a new physical register whenever a new instance of any logical register is created (register allocation) is performed by the "register renaming and allocation unit" (304).

Whenever a new physical register is allocated, the "register renaming and allocation unit" (304) also notifies the reorder buffer (305). The reorder buffer holds an entry for each physical target, identifying a certain instance of a certain logical register. Each reorder buffer entry contains the physical register, the logical register it represents, and the completion status of said physical register. In the implementation that will be described, there may exist up to 32 reorder-buffer entries at a given time. Whenever a new physical register is allocated by the "register renaming and allocation unit" (304), a new entry in the reorder buffer (305) is made. As the instructions are still processed in order at the predecode stage, the reorder buffer entries are also made in sequential order, which means that an entry that represents an early instance of a logical register always precedes an entry corresponding to a later instance of the same logical register.

Each reorder buffer entry also contains the completion status of its target register. Of course, when the entry is made, the completion status is "not completed". As soon as a certain register value is evaluated, the completion status of its corresponding reorder buffer entry is changed to "completed". The reorder buffer is realized as a wrap-around buffer; it can contain up to 32 entries.

The instruction buffer (303) now contains two instructions of the external instruction stream in a format suitable for the reservation station. The logical registers have been replaced by the appropriate physical registers by the "register renaming and allocation unit" (304), and, whenever a new physical register had to be allocated, an appropriate entry has been made in the reorder buffer (305).

The instructions are now ready to be forwarded to the reservation station (306). The reservation station is implemented as a wrap-around buffer with up to 16 possible entries.

In the reservation station (306), the instructions wait for their source operands. As soon as all the source operands of an instruction have arrived, the instruction signals that it is ready to be dispatched to one of the functional units. Instructions are dispatched to the functional units out of their sequential order, which means that dispatching an instruction is independent of whether the preceding or the following instruction has already been dispatched. Instructions are dispatched to one of the functional units dependent on the type of the instruction: Branches are forwarded to the branch unit (307) integer arithmetics are performed by an integer unit (308), and all instructions that access memory are dispatched to the load/store unit (309). The load/store unit exchanges data with data memory (312) via a data cache (311).

A copy of the register file (310) is attached to each functional unit. When changes are made to any of these register files, the other register files at different functional units are updated. Each register file (310) contains the values of all the physical registers that have been allocated so far.

As each physical register corresponds to an instance of a certain logical register, the register file (310) holds the values of those instances of logical register that have been evaluated so far.

It is advantageous to have a copy of the register file in close proximity to each functional unit. An instruction that has been forwarded to one of the functional units (307, 308, 309) has to access the values of its respective source registers. These register values are contained in the local copy of the register file (310). As soon as result data is produced this result data is written to the local register file. Because the logical source and target registers of an instruction have already been renamed to physical registers at the predecode stage (302), an instruction that is forwarded to a functional unit can directly access the physical source and target registers of the register file, as it is not necessary any more to translate logical to physical registers. This translation has once and for all been done at the predecode stage (302) by the "register renaming and allocation unit" (304). By keeping a local copy of the register file at each functional unit, it is possible to further reduce access time to the contents of registers.

During the commit process, the target register values produced by these instructions become architected register values. Thus, the commit or retire process defines an architected state of the machine. This architected state advances in sequential order from old to more recent instructions, and thereby transforms the corresponding provisional instances of logical registers to valid architected register values.

In order to understand how the commit process works, it is necessary to look at the completion status of the different target register instances stored in the reorder buffer (305). The commit process starts searching for the oldest instruction that has not yet been completed. The retire pointer (313) points to the entry corresponding to said instruction. This instruction can not be retired yet, because its results are not yet available. But all the instructions, and all the corresponding target registers preceding the entry defined by the retire pointer, can be committed. The corresponding instructions are cleared from the reservation station, and the target register values become architected register values. Thus, the architected state (314) is defined by the target register values that precede the reorder buffer entry to which the retire pointer (313) points.

Figure 4:
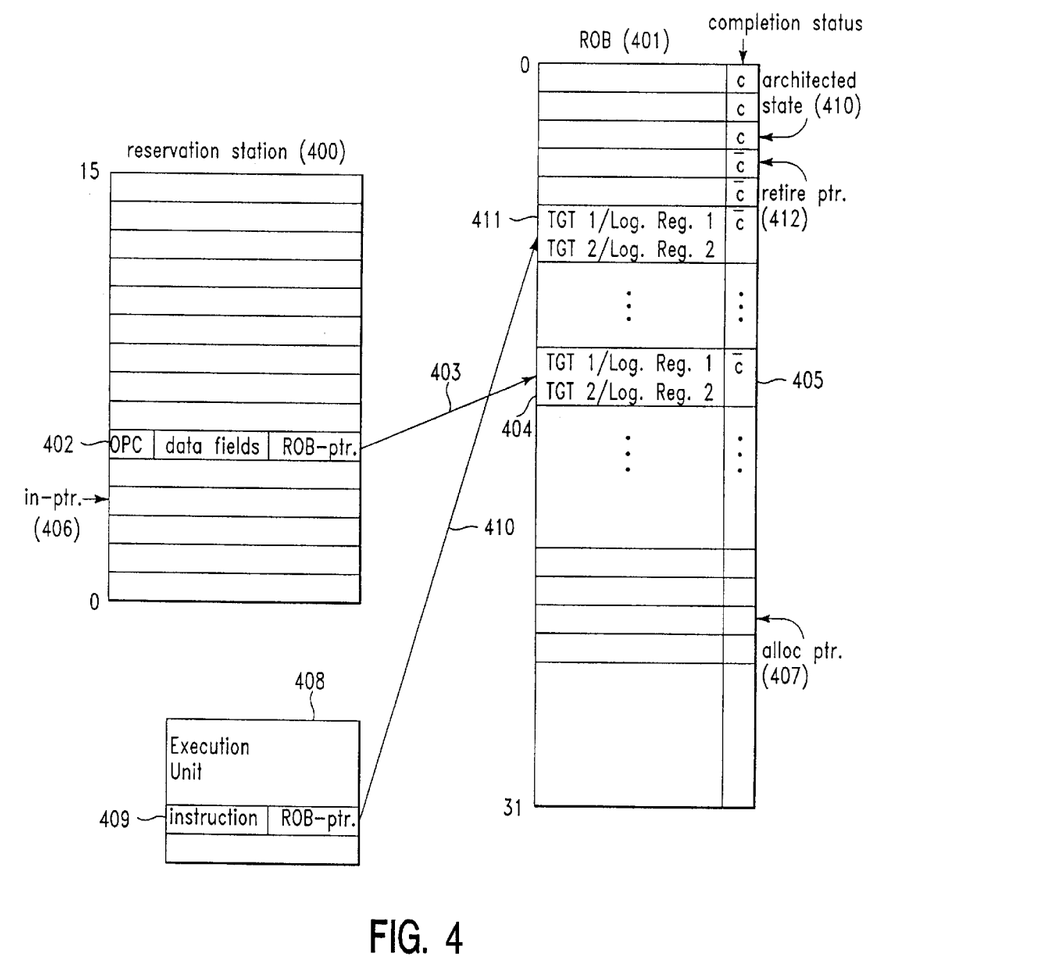
FIG. 4 shows how the reservation station interacts with the reorder buffer, in order to correctly monitor the completion status, and to allow for precise interrupts.

The interplay between the reservation station and the reorder buffer will become more clear when looking at FIG. 4. The reservation station (400) can accommodate up to 16 instructions. One of the reservation station entries (402) is shown. It contains the OP-code of the instruction, data fields for source registers, target registers, and for address calculation. Each instruction can access up to two target registers.

For the target registers that belong to one instruction, an entry in the reorder buffer (401) is made. Each new target register corresponds to a new instance of a certain logical register. Both its physical register and its logical register are identified in the respective reorder buffer entry (404, 411).

The connection between the reservation station entry (402) and the corresponding reorder buffer entry (404), which holds information about the target register or the target registers used by the instruction, is established by the reorder buffer pointer (403). The reorder buffer pointer is part of the reservation station entry (402).

In each reorder buffer entry (404), there further exists a data field (405) which monitors the completion status of the target registers (404) contained in the ROB entry. Initially, a target register's status is "not completed" (405).

As soon as all the source data of a reservation station entry is available, an instruction can be dispatched to one of the execution units (408). In the example of FIG. 4, the instruction 409 is just being processed by the execution unit (408), which means that the instruction is at some stage of the execution unit's pipeline. Together with the instruction, the ROB-pointer (410) has been forwarded to the execution unit (408). Thus, the connection between the instruction (409) and its corresponding entry in the reorder buffer (411) is maintained even during the course of instruction execution.

As soon as the results of instruction execution are available, which is usually at the end of the execution unit's pipeline, the completion status in the ROB changes from "not completed" to "completed". Thus, the reorder buffer (401) contains the identifiers of different instances of the logical registers in their sequential order, and further contains information about whether the value of said register instances has already been evaluated or not.

The reservation station (400) is implemented as an array with wrap-around, with administration being done by means of pointers. Whenever an instruction in its correct format is to be forwarded from the instruction buffer (303) to the reservation station (400), the appropriate entry position is determined by the in-pointer (406). In case the instruction will address one or two target registers, an entry to the reorder buffer will have to be made as well.

The reorder buffer (401) is also implemented as a circular buffer. There exists an allocation pointer (407), which serves as the reorder buffer's in-pointer. It points to the position in the reorder buffer where the next entry is to be made.

While the allocation pointer (407) is necessary to accommodate the targets of new instructions, the retire pointer (412) is necessary for retiring old target register values.

The retire pointer (412) points to the oldest target register that has not yet been completed. The commit process commits the target registers of entries that are older, which means earlier in sequence, than the entry the retire pointer points to. This means that the respective entries are freed and that the target register values become the values of the architected registers, which represent the "official" state of the machine. Additionally, the commit process purges all the instructions in the reservation station that correspond to ROB-entries preceding the entry the retire pointer (412) points to. Executing instructions out-of-order produces a number of provisional instances of logical registers, that might still be subject to changes and purges. But there also exists a precise architected state (413), which is a defined point in the sequential instruction stream, with the architected register values corresponding to said point in the instruction stream.

In the following, the structure and administration of the register file will be described. The layout of the register file array is given in FIG. 5. When looking back to FIG. 3, it becomes obvious that per functional unit, for example per branch unit (307), per integer unit (308), and per load/store unit (309), there has to exist one attached register file array (310). Each register file array comprises four data columns (500, 501, 502, 503), with each column consisting of 16 entries for storing the different register contents, and one extra column (510) for the value of the I0/I1 counters which also consists of 16 entries. This column stores the pointers to the respective architected register value of each row, the so-called "in-order pointers". While the width of an entry in one of the data columns is 36 bits, the entries of the I0/I1 column only consist of two bits.

Figure 5:
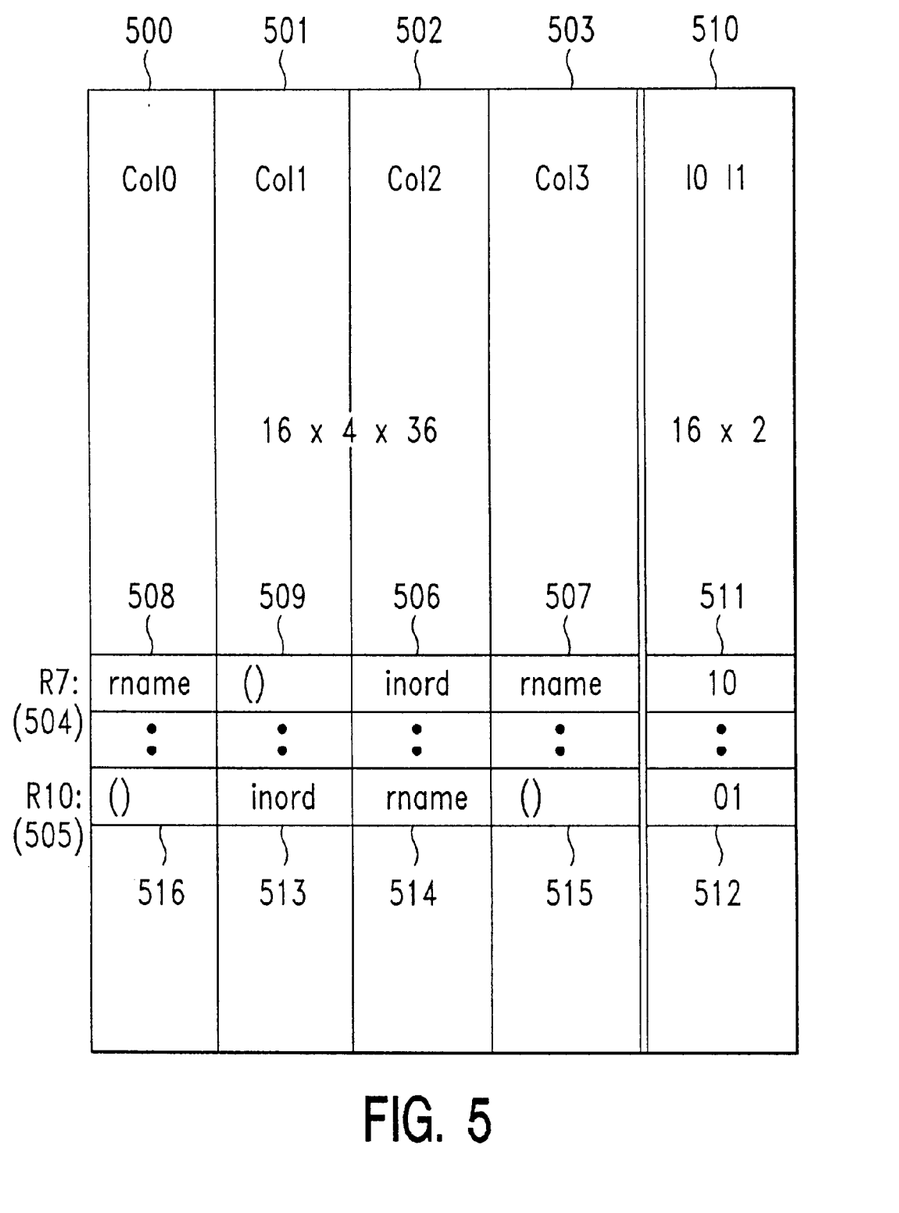
FIG. 5 shows the register file that is used for storing both the architected and the provisional register contents.

Each of the 16 rows of the four data columns (500, 501, 502, 503) holds the values of the different instances of one logical register. For example, row 504 contains the different physical instances of the logical register R7. Accordingly, row 505 holds the different instances of the logical register R10. Each of the four 36 bit-wide row entries may contain the value of an instance of the logical register which is represented by the row the entry belongs to.

In our example, there exist three physical instances (506, 507, 508) of the logical register R7. The register value of R7 in column 2 (506) contains the architected register value of R7. Data field 507 in column 3 (503) represents a first provisional instance of R7, and data field 508 in column 0 (500) holds a second provisional instance of R7. The third provisional instance does not exist yet, therefore, data field 509 in column 1 (501) is empty. The register file array proposed can only hold up to three provisional instances of one logical register, besides the architected state of said register. In the following, the architected state of a logical register will also be referred to as the "in-order state" of said logical register (506), the additional physical instances of the same logical register (507, 508) will be referred to as rename registers.

The I0/I1 column (510) provides two bits per logical register. These two bits determine, which of the four possible data fields in its row contains the in-order state of the logical register. In case the status of I0/I1 is "00", the architected state is to be found in the data field of column 0 (500); in case I0/I1 is "01", the architected state is to be found in the data field of column 1 (501), in case I0/I1 is "10", the respective data field is in column 2 (502), and in case I0/I1 is "11", column 3 holds the in-order state. When looking at the row that represents the logical register R7 (504), the status of I0/I1 (511) is "10", and therefore, the architected value of register R7 is to be found in data field 506, which is part of column 2 (502).

As another example, the row representing register R10 (505) is given. The I0/I1 data field 512 contains "01", which means that data field 513, which is part of column 1, holds the architected value of the logical register R10. There always has to exist an in-order value of each logical register. Additionally, there exists one rename instance of R10 contained in data field 514 of column 2. There does not exist a second and third rename instance of R10, and thus the data fields 515 and 516 in columns 3 and 0 are empty.

Figure 6:
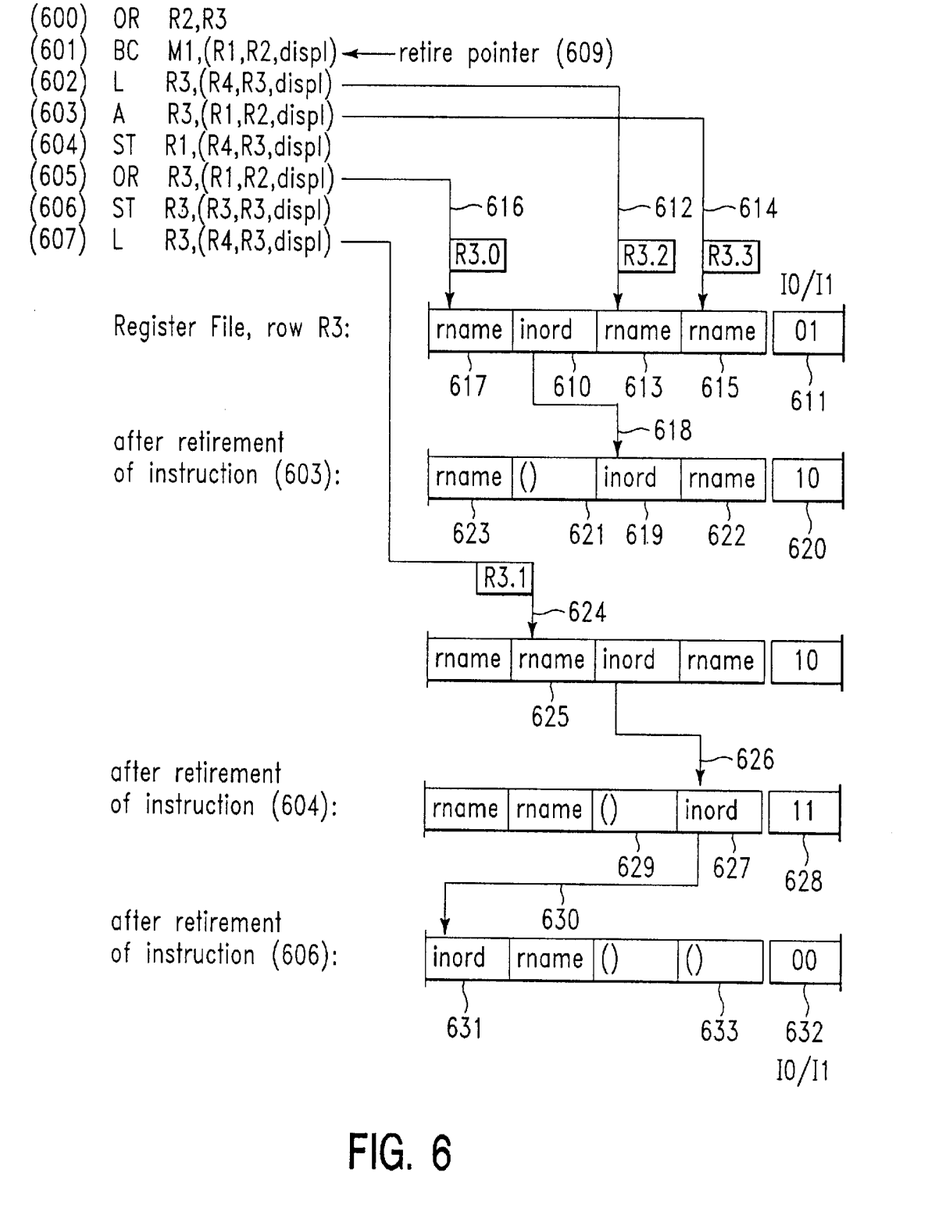
FIG. 6 gives a method for allocating and renaming registers, which is applied to the program example of FIG. 2.

FIG. 6 shows, by means of the program example of FIG. 2, how the register array of FIG. 5 can be used for allocating new rename instances of a certain logical register, for renaming logical registers to physical registers, and for retiring old register instances in order to continuously advance the architected state of the machine.

The instructions 600–607 correspond exactly to the instructions 200–207 of FIG. 2. Again, only the instances of the logical register R3 will be observed. The instances of R3 that emerge in the course of instruction execution are those shown in the right-hand column of FIG. 2.

Initially, the retire pointer (609) points to the "branch on condition" instruction (601). The preceding "or" instruction (600) uses the instance R3.1 as a source register. This instance R3.1 is still used as a source register by the load instruction (602). As the architected state or in-order state of the system can be defined as the status of all registers immediately before the instruction the retire pointer points to, the instance R3.1 represents the in-order state of the machine.

Next, it will be shown how the different register instances are taken care of by a register file according to FIG. 5. In order to do this, the row for register R3 of the register file will be observed. FIG. 6 shows how this row changes in the course of program execution.

Initially, the content of the counter I0/I1 is "01" (611). This counter thus points to the second data field 610 of the register file row. This means that instance R3.1, whose value is contained in data field 610, represents the architected state. The other three entries of said row may contain rename instances.

As program execution progresses, the load instruction (602) will be processed. Said load instruction uses instance R3.1 as a source, and writes to register R3. Thus, a new actual instance of R3, R3.2, emerges (209), and a physical register will have to be allocated in order to host this new instance. In step 612, the rename instance 613 is allocated for the instance R3.2. Each instruction that uses R3.2 as a source register will have to access data field 613.

The add instruction (603) uses R3.2 as a source, and writes to target register R3. For the new instance R3.3, another rename register data field (615) is allocated (614) in the register file.

The next instance of R3 will be produced by the OR instruction (605). The OR instruction writes to R3 as a target register and thus produces the instance R3.0. In step 616, the rename register data field (617) is allocated in order to represent the instance R3.0.

Each row of the register file can hold the architected instance plus a maximum of three rename instances. As all the rename instances (613, 615, 617) have been allocated, no further rename instances can be allocated until the commit process retires old register instances.

Let's assume that both the load (602) and the add instruction (603), which has produced the target register instance R3.3, are retired. This implies that register instance R3.2 will become the new architected value of R3 (618). This is indicated by incrementing the in-order pointer I0/I1 to "10" (620), which now points to the data field (619) for R3.2. The rename instances for R3.3 (622) and for R3.0 (623) continue to exist, while data field 621 is no longer occupied.

In the further course of instruction decoding, one will come across the load instruction (607), which uses R3.0 as a source, and which produces R3.1 as a target. As the data field (621) does not contain any rename instance any more, it can be allocated, in step 624, as the rename instance (625) for R3.1.

Next, the store instruction (604) is retired. This implies that the preceding register status can become the architected state. Thus, register instance R3.3 becomes the new architected state of register R3 (626). The counter I0/I1 is incremented to "11" (628), in order to point to data field 627. Data field 629 does no longer contain any register instance.

The instance R3.3 is freed as soon as the store instruction (606) is retired, because at that point of time, R3.0 becomes the new architected value of R3 (630). Counter I0/I1 jumps to "00" (632), and points to the first data field 631. Now, there exist two non-occupied data fields.

Figure 7:
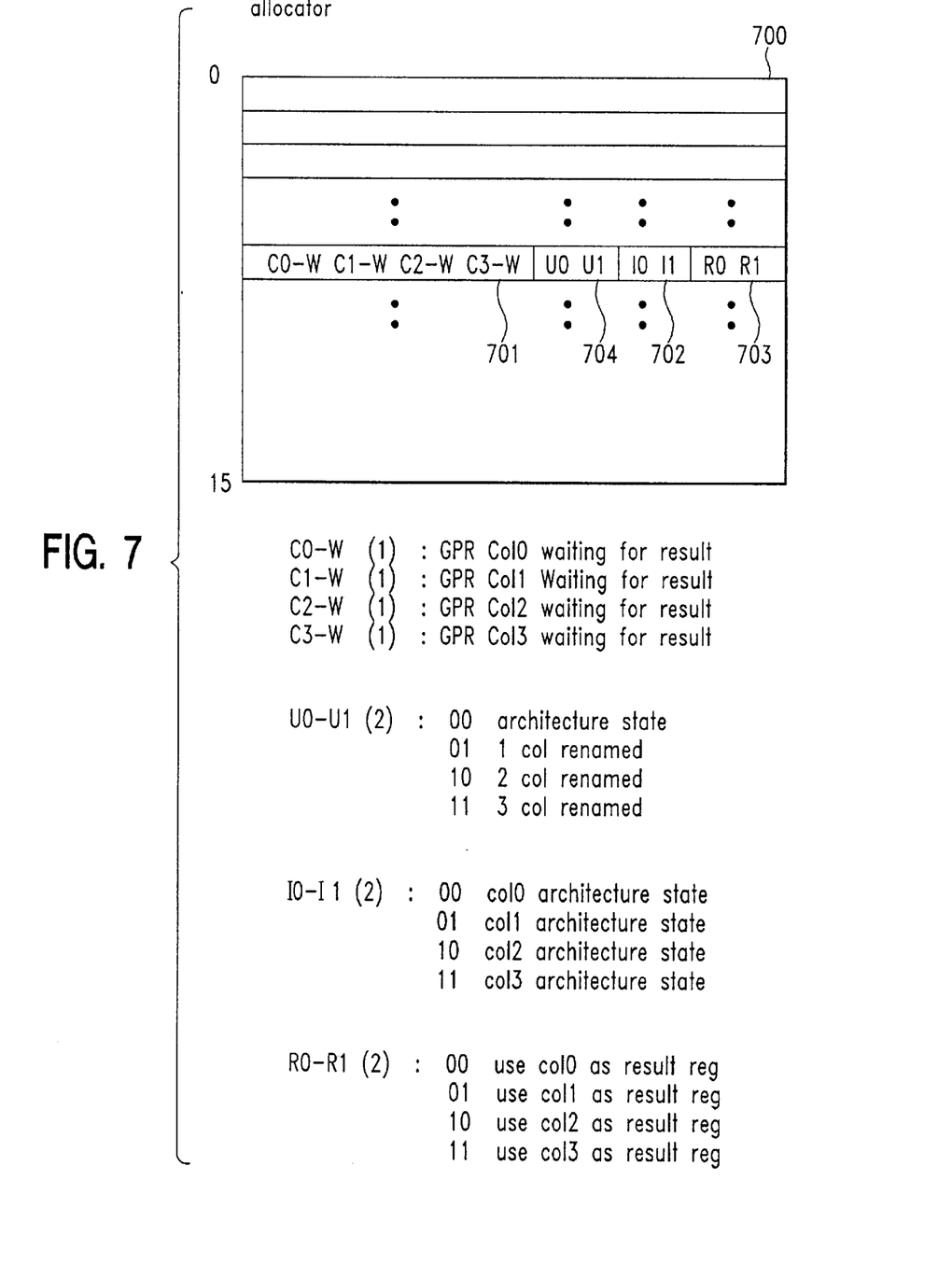
FIG. 7 gives the structure of the allocator array, together with one of its entries containing both the in-order and the rename pointer.

FIG. 7 depicts the structure of the allocator which is responsible that at the register renaming and allocation stage, the correct physical registers are addressed. The allocator is an array that contains one entry per logical register. In our example there exist 16 logical registers R0-R15, each of which is represented by a row in the register file. Thus, each entry in the allocator, which is 10 bits wide, corresponds to one row of the register file.

The counter I0/I1 indicates which of the four entries in said row contains the in-order state. The I0/I1 counter exists twice: There is an extra column in the register file (510 in FIG. 5) which holds the values of the I0/I1 counters, and there exists another copy of the I0/I1 counter in each allocator entry (702).

Whenever an old architected register value of a certain logical register is to be retired, this is done by simply incrementing the corresponding in-order pointer I0/I1. Thus the first rename instance becomes the new in-order register. The former in-order register is purged, and a vacancy emerges, which can accommodate a new rename instance.

Additionally, both for the renaming and the allocation process, the latest rename instance has to be known. This is done by the "rename pointer" R0/R1, which is part of each allocator entry (703). Let's go back to FIG. 5 for an example. In the row for register R7 (504), column 2 holds the in-order state (506). Therefore I0/I1 (511) equals "10". Additionally, there exist two rename instances (507, 508). The value of the R0/R1 counter in the corresponding allocator entry is therefore "00", because data field 508 is the latest rename instance.

In case the logical register R7 is accessed as a source register, the actual rename instance (508), which is indicated by R0/R1, has to be accessed.

In case the logical register R7 is accessed as a target register, a new physical instance of R7 has to be allocated first. This is done by incrementing the R0/R1 counter in the corresponding allocator entry to "01". Thus, data field 509, which has been vacant before, is now allocated as the third rename instance of R7. As the status of R0/R1 is now "01", all the following read accesses will refer to the allocated new rename instance in data field 509. The counter R0/R1, the "rename pointer", always points to the latest rename instance. In each allocator entry there exists a third counter, U0/U1 (704), which indicates how many rename instances exist. This value represents the difference between the counters R0/R1 and I0/I1.

Furtheron, there exists one bit per register file entry (701), which indicates whether the result data for each of the register instances has already been calculated. These bits directly correspond to the respective source valid bits in the reservation station. In case a result arrives that is needed by an instruction, and said instruction has not yet been forwarded to the reservation station, these bits are indispensable. They notify the instruction that its source data has arrived.

Figure 8A:
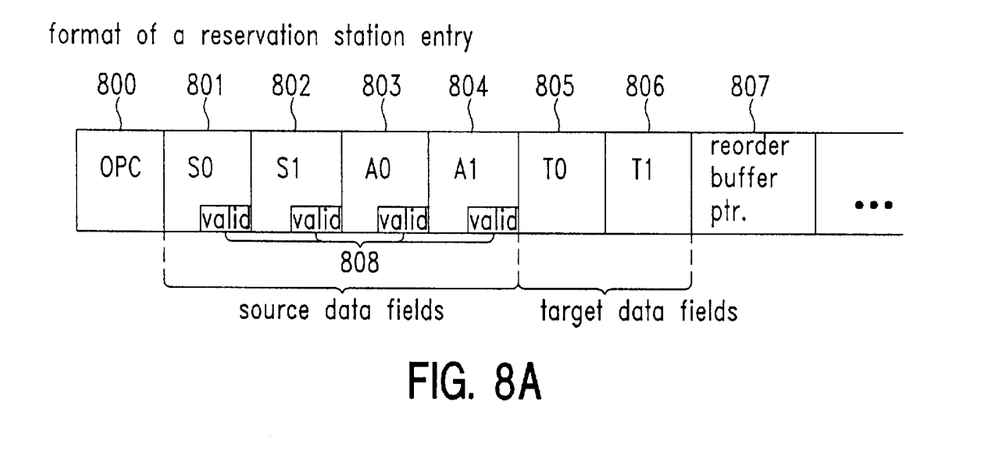
FIG. 8A depicts the format of a reservation station entry.

In FIG. 8A, the format of a reservation station entry is shown. Each instruction of the external instruction stream is converted to this format at the predecode stage (302). Instructions contained in the instruction buffer already have the correct format.

In each reservation station entry, there exists a data field for the instruction's OP-code (800). Furtheron there are four source data fields (801, 802, 803, 804) that specify the physical source registers of the instruction. Two of said source data fields, S0 (801) and S1 (802) directly specify operands of the instruction. The data fields A0 (803) and A1 (804) specify physical source registers that are used for address arithmetic (as "index" and "base"). For each of these source data fields, there exists a valid bit (808) indicating whether the content of the corresponding physical register is available or not.

Data produced during execution of the instruction is written to the instruction's target registers, which have to be specified as well. The data fields T0 (805) and T1 (806) specify the physical registers to which results are to be written. As described in FIG. 4, there further exists a reorder buffer pointer (807) in each reservation station entry, which establishes the connection to a corresponding entry in the reorder buffer.

Figure 8B:
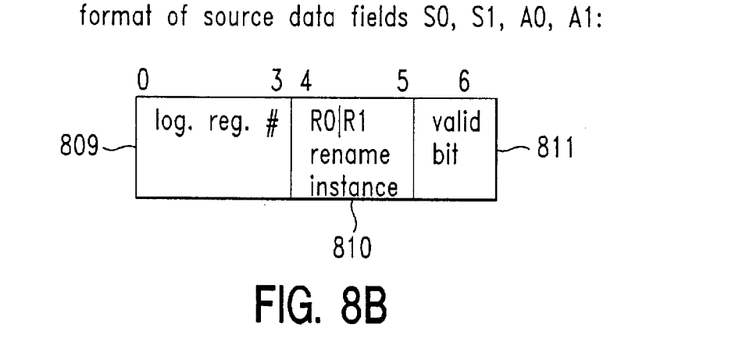
FIG. 8B shows the structure of the identifier used for specifying the physical source registers.
Figure 8C:
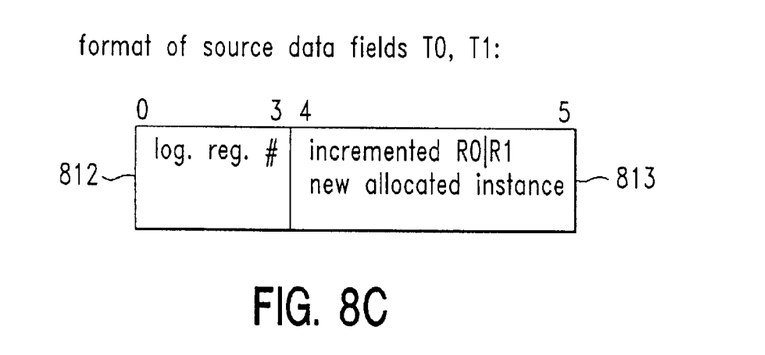
FIG. 8C shows the structure of the identifier used for specifying the physical target registers.

In each of the data fields S0, S1, A0, A1, T0 and T1 (801–806), a certain physical general purpose register has to be specified. In FIGS. 8B and 8C it is shown how the identification of the correct physical register can be achieved.

FIG. 8B shows the format of a reservation station entry's source data fields S0 (801), S1 (802), A0 (803) and A1 (804). First, the logical register number, which is known from the instruction itself, is given by bits 0–3. Next, the actual physical instance of said logical register has to be specified. This is done by copying the corresponding R0/R1 value from the allocator to the respective source data field (810). This two bit wide suffix specifies the physical rename instance of the logical register which is to be used as an argument of the instruction. The next bit (811) is a valid bit which signals whether the content of the addressed physical register is available or not.

In case of a target data field (T0, T1), the situation is different, because a new physical instance of the addressed logical register will have to be allocated first. Bits 0–3 of a target data field contain the logical register number (812) of the target register, which is already known from the instruction itself. Next, an actual physical instance of said logical register has to be specified. Here, it would be wrong to just copy the content of R0/R1, because the corresponding physical register already exists. Instead, a new physical instance of said logical register is allocated by incrementing the counter R0/R1 in the corresponding allocator entry before copying the content of R0/R1 to bit 4 and 5 of the respective target data field (813). When doing this, it also has to be checked whether there still exists a non-occupied entry in the register file. If there is no non-occupied entry in the register file, allocation will have to be postponed until some earlier register instances have been retired.

Figure 9:
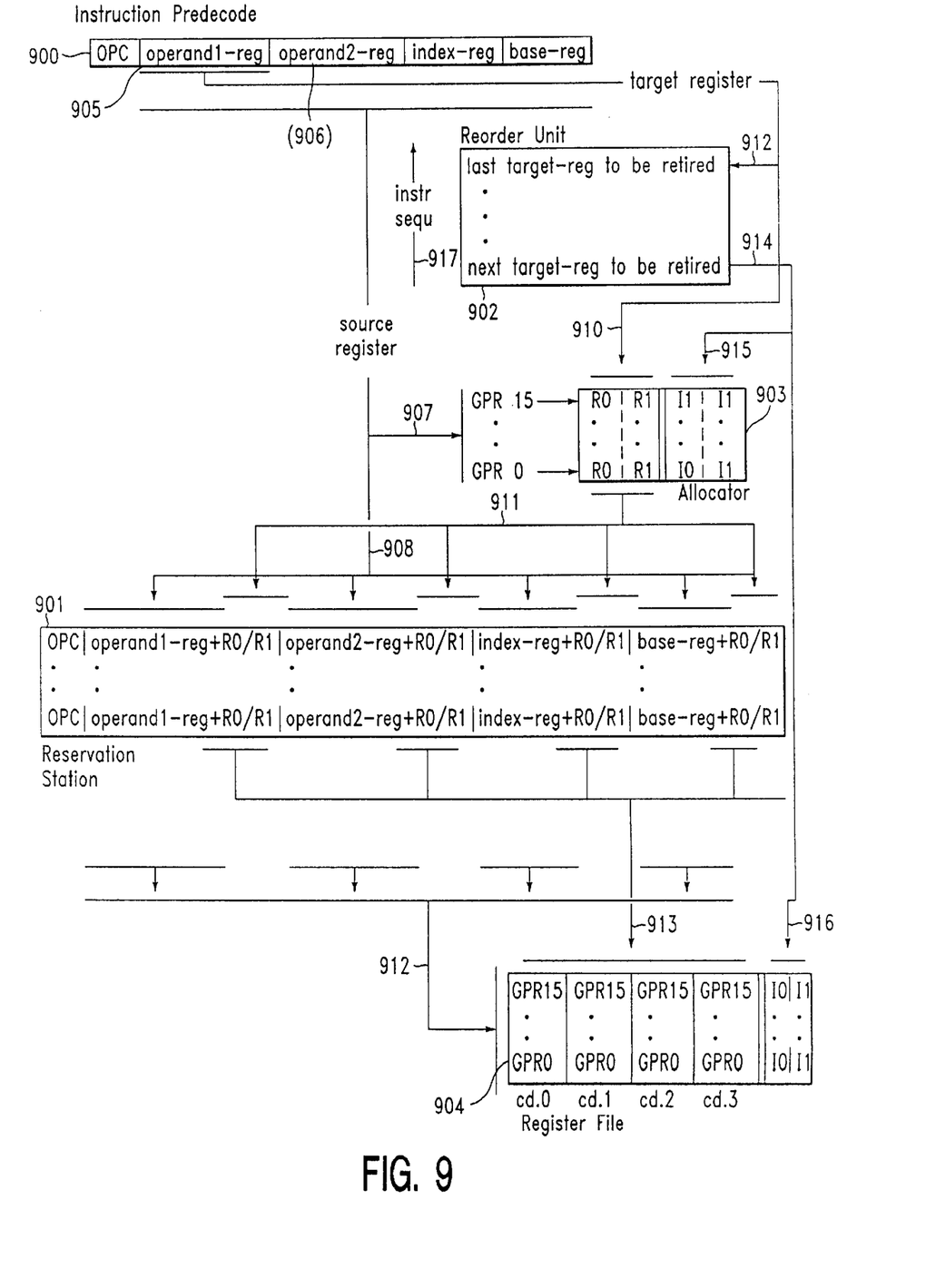
FIG. 9 shows an implementation of a superscalar computer system, comprising a reservation station, a reorder unit, an allocator according to FIG. 7, and a register file according to FIG. 5.

FIG. 9 gives an overview over the whole out-of-order processing system. It shows the functional dependencies between the instruction predecode (900), the reservation station (901), the reorder unit (902), the allocator (903) and the register file (904).

An instruction that has been fetched from the instruction cache (301), that has been converted to the common instruction format, and that is stored in the instruction buffer (303), is analyzed at the instruction predecode stage (900). The entry in the instruction buffer only contains the logical source and target registers, which have already been supplied with the external instruction.

Let us assume that the operand2-register (906) is a logical source register. In this case, register renaming has to be performed, in order to generate the appropriate physical register instance. For this purpose the value of the R0/R1 counter corresponding to said logical register is read (907) from the allocator array. The R0/R1 counter points to the most recently allocated physical instance of said logical register. When the instruction buffer entry is forwarded to the reservation station (901), the R0/R1 value that has just been determined is added as a suffix to the operand2-register identifier (908).

Let us next make the assumption that the operand1-register (905) is a logical target register. In this case, a new physical register instance will have to be allocated. This is done by accessing (910) the allocator (903), and incrementing the R0/R1 value corresponding to the logical register defined by the operand1-register. Thus, a new physical rename instance of said logical register starts to exist. When the instruction is forwarded from the instruction buffer to the reservation station, the new (incremented) R0/R1 value is appended as a suffix to the logical operand1-register (911).

Additionally, for each allocated physical instance corresponding to a logical target register, an entry in the reorder unit (902) has to be made. Entries in the reorder unit are made in sequential order (917). As the oldest non-committed entry in the reorder unit specifies the "next target register to be retired", the entry that has to be made for the most recently allocated target register instance will specify the "last target register to be retired" (912).

As a result of the register renaming and allocation step, each operand data field in the reservation station (901) does contain an R0/R1 value which allows to unambiguously identify one specific physical register instance in the register file (904). Therefore, the information contained in each reservation station entry directly allows to read source register data from (912) and to write target register data to (913) the register file (904).

Last, the process of retiring an old physical instance of a logical register will be described. The next physical target register instance to be retired is specified by the oldest entry in the reorder unit (902). The oldest instance of a certain logical register in the register file represents the actual architected state. The column of the register file that holds the architected value of a certain logical register is given by its in-order pointer, by the I0/I1 counter corresponding to said logical register.

In order to retire the actual architected register value of a certain logical register, the I0/I1 counter simply has to be incremented. Thus the former architected register value is lost and the former first rename instance becomes the new architected register value.

Both in the allocator (903) and in the register file (904), I0/I1 counters for each logical register are contained. For retiring a certain target register (914), it is therefore necessary to increment both the corresponding I0/I1 value in the allocator (915) and in the register file (916).

We claim:

1. A computer system having a processor which processes instructions out-of-order, wherein said instructions address logical registers, and wherein each of said logical registers is represented by a set of at least one physical register, each of said sets of physical registers having one physical register representing a non-speculative architected state of a logical register of said logical registers, and the remaining physical registers in said set of physical registers representing rename instances of said logical register, the computer system comprising:

array means including said physical registers representing the architected states of said logical registers, and said physical registers representing rename instances of said logical registers, and a first indication means for continuously successively determining which of the physical registers of each set of physical registers actually represents said architected state of said logical registers, said continuous successive determination being made without requiring the transfer of data from the physical registers;

second indication means indicating which of the physical registers of each of said sets of physical registers actually represents the sequentially most recent one of said rename instances;

wherein said first indication means and said second indication means are realized as pointers; and said first indication means determining which of the physical registers of each set of physical registers actually represents said architected state of said logical register; and said second indication means indicating which of the physical registers of each set of physical registers actually represents the sequentially most recent one of said rename instances.

2. A computer system according to claim 1, further comprising a second indication means for successively indicating which of the physical registers of each of said sets of physical registers actually represents the sequentially most recent one of said rename instances, said successive indication being made without requiring the transfer of data from the physical registers.

3. A computer system according to claim 1, characterized in that said first indication means are realized as pointers, determining which of the physical registers of each set of physical registers actually represents said architected state of said logical register.

4. An computer system according to claim 2, characterized in that said second indication means are realized as pointers, indicating which of the physical registers of each set of physical registers actually represents the sequentially most recent one of said rename instances.

5. A computer system according to claim 1, characterized in that said array means are implemented as circular array means, wherein physical registers which have represented the architected state of one of said logical registers, and which do not represent the architected state of said logical register any more, being reusable for representing new rename instances.

6. A computer system according to claim 1, further comprising allocation means for allocating new physical registers which furtheron represent new rename instances of said logical registers.

7. A computer system according to claim 6, characterized in that said allocation means comprise update means, which update said second indication means, if new physical registers are allocated, in order to indicate which of the physical registers of each of said sets of physical registers actually represents the sequentially most recent one of said rename instances.

8. A computer system according to claim 2, further comprising renaming means for renaming a given logical register to the physical register representing the sequentially most recent instance of said logical register, wherein said sequentially most recent instance of said logical register being determined by accessing said second indication means.

9. A computer system according to claim 1, further comprising retiring means, for setting free the physical register representing said architected state of one of said logical registers, determining the sequentially oldest one of said set of physical registers representing rename instances of said logical register, which is to furtheron represent said architected state of said logical register, and updating said first indication means, with said first indication means determining which of the physical registers of each set of physical registers actually represents said architected state of said logical register.

10. A method for administering a set of at least one physical register representing a logical register in a computer system, said computer system having a processor which processes instructions out-of-order, wherein said instructions address logical registers, and wherein each of said logical registers is represented by a set of at least one physical register, each of said sets of physical registers having one physical register representing a non-speculative architected state of a logical register of said logical registers, and the remaining physical registers in said set of physical registers representing rename instances of said logical register, said computer system further including a first indication means for successively determining which of the physical registers of each set of physical registers actually represents said architected state of said logical registers, the method comprising the steps of:

setting free said physical register representing said architected state of said logical register, determining the sequentially oldest one of said set of physical registers representing rename instances of said logical register which is to thereafter represent said architected state of said logical register, and updating said first indication means to continuously successively determine the physical register representing the architected state of the logical register said updating being done without requiring the transfer of data from the physical registers;

said first indication means determining which of the physical registers of each set of physical registers of each set of physical registers actually represents said architected state of said logical register;

updating said first indication means determining which of the physical registers of each set of physical registers actually represents said architected state of said logical register; and further providing array means which contain both said physical registers representing the architected states of said logical registers, and said physical registers representing rename instances of said logical registers;

said array means being realized as circular array means;

wherein physical registers which have represented the architected state of one of said logical registers, and which do not represent the architected state of said logical register any more, being reused for representing new rename instances.

11. A method according to claim 10, further providing array means which contain both said physical registers representing the architected states of said logical registers, and said physical registers representing rename instances of said logical registers.

12. A method according to claim 11, further characterized in that said array means being realized as circular array means, wherein physical registers which have represented the architected state of one of said logical registers, and which do not represent the architected state of said logical register any more, being reused for representing new rename instances.

13. A method according to claim 10, further characterized in that said first indication means being realized as pointers, determining which of the physical registers of each set of physical registers actually represents said architected state of said logical register.

* * * * *